(12) United States Patent
Schueller

(10) Patent No.: US 11,993,340 B2
(45) Date of Patent: May 28, 2024

(54) ADJUSTABLE HYDRAULIC MOTORCYCLE BRAKE SYSTEM AND DEVICE

(71) Applicant: OX-Motorcycle Products, LLC, Salt Lake City, UT (US)

(72) Inventor: Charles Robert Schueller, Salt Lake City, UT (US)

(73) Assignee: OX-MOTORCYCLE PRODUCTS, LLC, Salt Lake City, UT (US)

( * ) Notice: Subject to any disclaimer, the term of this patent is extended or adjusted under 35 U.S.C. 154(b) by 133 days.

(21) Appl. No.: 17/230,683

(22) Filed: Apr. 14, 2021

(65) Prior Publication Data
US 2022/0332388 A1 Oct. 20, 2022

(51) Int. Cl.
| | | |
|---|---|---|
| *B60T 13/74* | (2006.01) | |
| *B62L 1/00* | (2006.01) | |
| *B62L 3/02* | (2006.01) | |
| *F16D 65/28* | (2006.01) | |
| *F16D 121/04* | (2012.01) | |
| *F16D 125/06* | (2012.01) | |

(52) U.S. Cl.
CPC ............ *B62L 1/005* (2013.01); *B62L 3/023* (2013.01); *F16D 65/28* (2013.01); *F16D 2121/04* (2013.01); *F16D 2125/06* (2013.01)

(58) Field of Classification Search
CPC .... B62L 3/02; B62L 3/023; B62L 3/08; B62L 1/005; F16D 65/28; F16D 2121/04; F16D 2125/06
USPC ............. 303/5, 6.01, 9.62, 9.64, 115.6, 137; 188/344
See application file for complete search history.

(56) References Cited

U.S. PATENT DOCUMENTS

| | | | | |
|---|---|---|---|---|
| 3,554,334 A | * | 1/1971 | Shimano | B62L 3/023 188/344 |
| 3,935,930 A | | 2/1976 | Kine | |
| 4,494,800 A | * | 1/1985 | Hayashi | B62L 3/023 303/115.6 |
| 4,560,049 A | * | 12/1985 | Uchibaba | B62K 23/02 192/85.01 |
| 5,273,346 A | * | 12/1993 | Tsuchida | B62L 1/00 303/2 |

(Continued)

FOREIGN PATENT DOCUMENTS

| | | | |
|---|---|---|---|
| CN | 101643066 A | * 8/2008 | |
| DE | 202017001935 U1 | * 11/2017 | ............... B62L 3/00 |

(Continued)

OTHER PUBLICATIONS

PCT International Search Report, Patent Cooperation Treaty, dated Jul. 21, 2021.

(Continued)

*Primary Examiner* — Christopher P Schwartz
(74) *Attorney, Agent, or Firm* — Loyal IP Law, PLLC; Travis Banta

(57) ABSTRACT

A system comprises a slave cylinder for a motorcycle. The slave cylinder may include a rod with a height which is hydraulically adjustable by a hydraulic pressure adjuster. A motorcycle slave cylinder is also provided which includes a rod having a height. The motorcycle slave cylinder also includes a hydraulic pressure adjuster. The hydraulic pressure adjuster hydraulically adjusts the height of the rod above the motorcycle slave cylinder.

20 Claims, 6 Drawing Sheets

(56) References Cited

U.S. PATENT DOCUMENTS

| | | | |
|---|---|---|---|
| 5,476,162 A * | 12/1995 | Reed | B60T 11/16 |
| | | | 188/344 |
| 5,813,501 A | 9/1998 | Terry, Sr. | |
| 7,431,131 B1 * | 10/2008 | Chevalier | B62K 5/01 |
| | | | 303/9.71 |
| 8,046,996 B2 | 11/2011 | Dunlap, III | |
| 9,404,544 B2 | 8/2016 | Macht | |
| 9,827,968 B2 * | 11/2017 | Bradley | B62L 3/023 |
| 11,603,082 B2 * | 3/2023 | Pongo | B60T 11/18 |
| 2006/0185943 A1 | 8/2006 | Takizawa | |
| 2006/0254842 A1 * | 11/2006 | Dagenais | B62K 5/05 |
| | | | 180/215 |
| 2012/0096851 A1 | 4/2012 | Lumpkin | |
| 2012/0124991 A1 * | 5/2012 | Thomas | F16D 25/088 |
| | | | 60/327 |
| 2013/0112510 A1 | 5/2013 | Jordan | |
| 2016/0200390 A1 * | 7/2016 | Carrasco Vergara | B62K 23/06 |
| | | | 60/594 |
| 2018/0015983 A1 * | 1/2018 | Schueller | B62L 3/023 |
| 2020/0377170 A1 * | 12/2020 | Schueller | B62L 3/023 |
| 2021/0380196 A1 * | 12/2021 | Schueller | B62L 3/023 |
| 2022/0009467 A1 * | 1/2022 | Henricksen | B60T 11/165 |

FOREIGN PATENT DOCUMENTS

| | | | | |
|---|---|---|---|---|
| EP | 2055625 A1 * | 5/2009 | | B60T 8/261 |
| EP | 2610121 A2 * | 7/2013 | | B60T 11/18 |
| JP | 2009067297 A * | 4/2009 | | B62L 3/04 |

OTHER PUBLICATIONS

Written Opinion of the International Searching Authority, Patent Cooperation Treaty, dated Jul. 21, 2021.

* cited by examiner

ADJUSTABLE HYDRAULIC MOTORCYCLE BRAKE SYSTEM AND DEVICE

BACKGROUND

1. Technical Field

This disclosure relates generally to an adjustable hydraulic motorcycle brake system and device. The device may be implemented as a slave or secondary cylinder that includes a hydraulically actuated rod for interacting with a rear brake master cylinder on a motorcycle. The device may further include a handle with a brake lever and a master cylinder which connects to the slave or secondary cylinder to actuate the rod and rear brake of the motorcycle independent of a motorcycle foot brake. The device may further include an adjuster which allows a user to adjust a height of the rod for interaction with the rear brake master cylinder of the motorcycle.

2. Description of the Related Art

Since ancient times, perhaps even as early as the invention of the wheel, human beings have developed new ways to move faster. Whether in the earliest Olympic footraces, horse races, or chariot races, humans have, since antiquity, endeavored to gain a strategic advantage over rivals by being able to travel at a faster rate than their rivals. Indeed, more often than not, the innovations in how to move faster outpaced the innovations for how to slow down after the higher speed was attained. In short, humans have been more driven by speed than the ability to stop.

For most of human history, wheels were the primary solution to increasing speed due to most vehicles being motivated by animal power and speed was controlled by a driver holding the reins on a draft animal. Due to animals having their own mind and not necessarily cooperating with commands from a driver, rudimentary friction brakes were applied to the stagecoaches and covered wagons of the old west to ensure that the driver had some ability to slow a vehicle. These brakes were essentially wooden levers covered with leather, in many cases, which could be pulled into contact with one wheel of a vehicle. The leather contact on the wheel caused friction between the lever and the wheel which made the wheel rotate more slowly than the others and caused the vehicle to slow. The drag created by the slowed wheel caused the draft animal to exert more energy to counteract the friction or submit and reduce pace.

Horses eventually gave way to horsepower as humans invented engines that were more efficient at propelling vehicles, though early engines, such as steam engines, were only suitable for use in large vehicles such as trains and large steam ships. However, these motors were far too big for moving a single person which at least in part inspired innovations in human powered vehicles such as the bicycle. The bicycle has been one of the most popular and widely accessible means of conveyance across the world since it was developed. Virtually every culture in every country actively relies on bicycles for transit between different locations. Bicycles are efficient, faster than walking or running, and take advantage of various physics principles to maintain motion even when the rider is resting. However, bicycles are still limited in speed because human beings are only so strong and only have so much endurance.

Thus, humans did what humans do and invented an engine that could be mounted to a bicycle. The first motorcycle was born. Eventually braking technology caught up to the desire to go faster and various braking mechanisms were developed to slow motorcycles down. Brake pads, calipers, and hydraulic pumps were developed to increase stopping power to meet the power of acceleration in the motorcycle. As time went on, controls for motorcycles were also standardized to allow a motorcycle rider to ride any motorcycle without having to become familiar with a new system. For example, a clutch lever is traditionally installed on a left hand side of a motorcycle's handlebars while a front brake is traditionally installed on a right hand side of a motorcycle's handlebars. A right foot brake, opposite a motorcycle gear shift on the left side of the motorcycle, was implemented by a lever a rider could actuate with a right foot. An accelerator is commonly installed on a right side of the motorcycle's handlebars to allow a person to use a right hand to either accelerate or apply the front brake and slow down. Since acceleration and braking do not frequently need to be performed at the same time, such an arrangement made the most logical sense. A motorcycle rider may accelerate by actuating the clutch lever with the left hand, selecting a gear with the left foot, and releasing the clutch lever with the left hand while simultaneously applying acceleration from interaction of the accelerator and the right hand. The rider may slow the motorcycle by either actuating the clutch with the left hand and downshifting with the left foot or by actuating the clutch with the left hand and applying pressure to a front brake lever with the right hand and to the rear brake by actuating the right foot brake lever.

One example of a conventional rear brake system is illustrated in FIG. 1. FIG. 1 illustrates a rear brake system 100 for a motorcycle. As shown in FIG. 1, a motorcycle may include a motorcycle frame 105 to which a brake lever 110 may be attached, directly or indirectly, by a connector 120, which is often times a bolt. Brake lever 110 may include a foot peg 115 which creates a large surface area such that a rider may find brake lever 110 by feeling for it with a right foot. The motorcycle may further include a footrest in many cases, which is not shown here, which positions a right foot at rest within easy reach of brake lever 110. When not in use, a brake stop 125 holds brake lever 110 and foot peg 115 at a particular position such that it remains in a consistent position for easy and immediate operation by a user. In many cases, brake lever 110 may be biased in a non-braking position by a spring which tends to drive brake stop 125 into frame 105 or another rigid metallic element which stops brake lever 110 from rotating too high for comfort around a pivot point which is implemented by connector 120. As shown brake stop 125 may be threaded and may include a nut which may allow the angle of brake lever 110 to be set at a position that is comfortable for the rider.

As mentioned, connector 120 serves as a pivot point for brake lever 110. When pressure is applied by a rider's right foot to foot peg 115, brake lever 110 pivots about connector 120 which causes a rod 135 connected to brake lever 110 by connector 130 to push up into rear brake master cylinder 140. As rod 135 interacts with master cylinder 140, hydraulic pressure within master cylinder 140 is increased which causes hydraulic pressure to proceed out of port 145 into brake hose 150 and into a rear brake caliper which, in many cases, squeezes brake pads together about a rim of the rear tire (or about a braking disc which travels between the brake pads), causing friction and drag on the tire which slows the rear tire. A separate system (or a system that uses the same master cylinder) may be operated by the front brake to apply hydraulic pressure to a front caliper and, typically, to a braking disc disposed between front brake pads in the front brake caliper.

Master cylinder 140 may also include a port 155 to receive fluid from a remote fluid reservoir through a hydraulic hose 160 which is secured to port 155 by a bolt 165. Master cylinder 140 may further be connected to frame 105 by a master cylinder mount 175 which is attached to master cylinder 140 by a connector 170. Master cylinder 140 may therefore be secured in place to selectively apply hydraulic pressure to a rear brake by actuating brake lever 110 and rod 135 applying pressure to master cylinder 140.

In another innovative system, described in U.S. Patent Publication No. 2020/0377170, an actuator is connected hydraulically to a left hand rear brake lever. The actuator caused a rod to push into the master cylinder independent of a right foot brake lever to cause rear wheel braking based on a braking lever installed on a left side of a motorcycle's handlebars. While this system is innovative, adjustment of a height of the rod to push on the master cylinder has been deemed by some users to be difficult. The height of the rod must be positioned such that it extends enough under hydraulic pressure to interact with the master cylinder but also low enough that it does not actuate the master cylinder when no braking is desired. Misalignment can cause decreases in speed and excessive brake wear in very little time. Further, the travel of the left hand brake lever was typically inadequate to get enough travel in the rod to reliably activate the rear brake, except when perfectly tuned. This was due to a piston within the actuator having a radius of 12.7 millimeters or less.

Despite the foregoing, a left hand rear brake is desirable and useful in many situations, the difficulty in installation notwithstanding. For example, right leg amputees or those with right leg control issues may safely ride a motorcycle with a left hand rear brake. In another example, a left hand rear brake may be profoundly useful to technical trail riders. On world class trails such as those in the Baja Peninsula, a rider may extend the legs away from the motorcycle to increase stability on a significant descent and still have access to the rear brake, especially on motorcycles that include an automatic clutch. In such adventurous trail riding, where gear is also carried by the motorcycle for multi-day trips, stability of the motorcycle can be adversely affected due to a shift in the center of gravity due to the weight of the gear on the motorcycle. Being able to extend the legs away from the motorcycle counteracts the instability of a higher center of gravity, but also reduces access to the rear motorcycle foot brake. Thus, stability is traded for reduced braking power, which may or may not be acceptable given a particular trail or terrain. Thus, the ability to control a rear wheel brake using a hand brake lever is very desirable, though the prior art suffers from adjustment difficulties.

It is therefore one object of this disclosure to provide a secondary or slave cylinder for actuating of a rod to interface with a master cylinder. It is another object of this disclosure to provide an adjuster for use with the secondary or slave cylinder that adjusts a height of the rod in the secondary or slave cylinder. It is another object of this disclosure to provide a secondary or slave cylinder with a rod to interface with a master cylinder using a hydraulic system that is independent of a hydraulic system associated with a motorcycle. Finally, it is an object of this disclosure to provide a secondary or slave cylinder which may be mounted directly on a right foot brake lever to facilitate operation of the brake by a left hand brake lever or the right foot brake lever.

SUMMARY

Disclosed herein is a system. The system comprises a slave cylinder for a motorcycle. The slave cylinder may include a rod with a height which is hydraulically adjustable by a hydraulic pressure adjuster.

Also disclosed herein is a device. The device may be implemented as a motorcycle slave cylinder is also provided which includes a rod having a height. The motorcycle slave cylinder also includes a hydraulic pressure adjuster. The hydraulic pressure adjuster hydraulically adjusts the height of the rod above the motorcycle slave cylinder.

BRIEF DESCRIPTION OF THE DRAWINGS

The accompanying drawings illustrate embodiments of an adjustable hydraulic motorcycle brake system and device.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the subject matter disclosed herein. While the techniques and embodiments will primarily be described in context with the accompanying drawings, those skilled in the art will further appreciate the techniques and embodiments may also be practiced in other similar apparatuses.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 2:
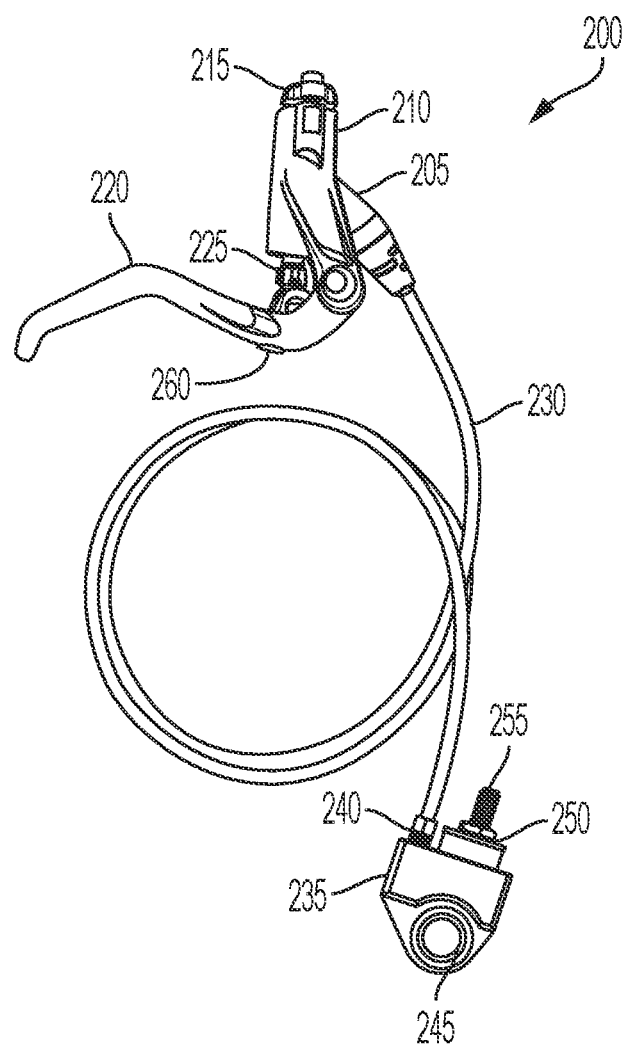
FIG. 2 illustrates an adjustable hydraulic motorcycle brake system.

FIG. 2 illustrates an adjustable hydraulic motorcycle brake system 200. System 200 includes a hand brake 205 which includes a master cylinder 210, a handlebar mount 215, a brake lever 220, a hydraulic pressure adjuster 225, and a lever travel adjuster 260. Master cylinder 210 within hand brake 205 may be implemented within hand brake 205 to apply hydraulic pressure to a hydraulic fluid within the system. Master cylinder 210 may further include an aperture, such as a threaded aperture for depositing hydraulic fluid within hand brake 205. Once hydraulic fluid is deposited within master cylinder 210, a process called "bleeding the brakes," which will be further explained below, may be conducted. Bleeding the brakes is essential for proper brake operation and serves to eliminate air or air bubbles within the hydraulic fluid. Since hydraulic fluid is not compressible under pressure and air is compressible, any air remaining in a hydraulic braking system may cause the brakes to fail. For example, when brake lever 220 is pulled toward hand brake 205, hydraulic fluid is forced to apply pressure at another point in the system, such as brake calipers, or a master cylinder rod, as will be discussed below. When air is in the system, the hydraulic fluid may compress the air which results in a failure to actuate the brake calipers or the master cylinder rod as insufficient hydraulic pressure is available to both compress air within the system and operate the brake calipers or master cylinder rod. Master cylinder 210 is a device which converts mechanical force, from a rider squeezing brake lever 220, for example, into hydraulic pressure to operate other components of the system 200.

Hand brake 205 may be secured to a handlebar of a motorcycle by a handlebar mount 215 which is disposed on hand brake 205. As shown in FIG. 2, handlebar mount 215 may be implemented by a rounded metal backing plate which may be screwed on a first and second end into hand brake 205 by corresponding screws. The rounded metal backing plate may include a radius that is approximately similar to the radius of the handlebar on the motorcycle and formed in generally a C shape such that the first and second ends are relatively proximate to hand brake 205 (e.g., within the length of a screw) for attaching the handlebar mount 215 to handlebars of a motorcycle. In other words, the backing plate may slide over the handlebars and position the first and second ends of the backing plate adjacent to hand brake 205 such that screws may apply pressure to the backing plate and handlebar to maintain hand brake 205 in a desired position on the handlebar of the motorcycle.

Hand brake 205 further includes a brake lever 220 which is attached to hand brake 205 by a pivoting connection such that brake lever 220 may be pulled and drawn toward hand brake 205. Brake lever 220 has a particular "throw" or "length of travel" which dictates how much pressure may be applied to master cylinder 210 and therefore to system 200. The harder brake lever 220 is squeezed, the further brake lever 220 travels towards hand brake 205, and the more hydraulic pressure is generated. At the same time, however, the length of travel for brake lever 220 from full extension to full contraction may be adjusted by a lever travel adjuster 260. Lever travel adjuster 260 determines where during the throw of the lever, or the length of travel of the lever, a hydraulic pressure curve starts and peaks and is subject to adjustment based on the rider's preferences. Lever travel adjuster 260 essentially determines where along the path of travel the master cylinder is engaged to create hydraulic pressure. Some riders prefer that braking power is virtually instant with very little brake lever travel while other riders want to "ride the brakes" and constantly hold brake lever 220 at a half travel position before actual braking occurs. For example, if the length of travel of brake lever 220 relative to hand brake 205 is 90 degrees, lever travel adjuster 260 may be set to engage hydraulic pressure at 85 degrees for one rider while another rider prefers engagement of hydraulic pressure to occur when brake lever 220 is positioned at 45 degrees relative to hand brake 205. For clarity, lever travel adjuster 260 determines only where along the length of travel of brake lever 220 begins to engage master cylinder 210 to produce hydraulic pressure.

Thus, hand brake 205 includes hydraulic pressure adjuster 225 which controls a hydraulic fluid pressure generated by master cylinder 210 within hand brake 205. Specifically, hydraulic pressure adjuster 225 sets a baseline hydraulic fluid pressure within system 200 to ensure that the hydraulic pressure available to a slave cylinder, such as slave cylinder 235, which will be discussed below, is sufficient to initiate braking force in a motorcycle master cylinder. For example, referring to a hydraulic pressure braking curve mentioned above from zero to peak pressure, lever travel adjuster 260 may determine where between 90 degrees and zero degrees braking force begins. Hydraulic pressure adjuster 225 determines a baseline pressure that may be constant within system 200. For example, hydraulic pressure adjuster 225 may be adjusted to maintain a baseline of 10% of overall braking force at all times in order to set a height of a master cylinder rod 255, as will be discussed below. In such a case, lever travel adjuster 260 may still adjust where along the length of pull of brake lever 220 braking begins and may cause a selective amount of pressure to be applied (e.g., for a quick stop or a slow stop of the motorcycle) over a baseline hydraulic pressure set by hydraulic pressure adjuster 225.

System 200 may further include a brake line 230 which connects to a slave or secondary cylinder 235. In the art, a slave or secondary cylinder 235 is typically referred to as a "slave" cylinder because the hydraulic function of a slave cylinder is controlled entirely by a master cylinder. Thus, for the purposes of explanation, the term "slave cylinder" 235 will be used. However, the term "secondary cylinder" is intended to have the same meaning which is conventionally known in the art as a "slave cylinder." Brake line 230 may be hydraulically rated to withstand pressures generated by system 200 and include appropriate connections for connecting hand brake 205 to slave cylinder 235. Brake line 230 may also be made from a material that is kink or dent resistant to ensure that appropriate and intended pressure is conveyed from master cylinder 210 in hand brake 205 to slave cylinder 235.

Slave cylinder 235 includes a port 240 for receiving hydraulic fluid and pressure communicated by master cylinder 210. As will be discussed below, port 240 may be hydraulically connected to a series of chambers and passages within slave cylinder 235 to cause an internal piston 250 to exert pressure on a rod 255 which may interact with a motorcycle master cylinder on a motorcycle to produce braking power. For example, as hydraulic pressure is communicated from hand brake 205 and master cylinder 215 to slave cylinder 235, the hydraulic pressure is applied to piston 250 which causes piston 250 to push rod 255 higher out of slave cylinder 235. While this will be discussed in more detail below, a height of rod 255 determines the amount of force that can be applied to a motorcycle master cylinder that controls a rear brake.

Finally, slave cylinder 235 may further include a mounting port 245 which allows slave cylinder 235 to be mounted to a motorcycle. In a preferable embodiment, the slave cylinder 235 may be mounted directly to a foot brake lever on a motorcycle, as will be discussed below. It is also noted that system 200 is described as shown in FIG. 2. However, modifications may be made that are still within the scope of the present disclosure. For example, components that are found within hand brake 205 in FIG. 2 need not be solely contained within hand brake 205. For example, master cylinder 210 may be external to hand brake 205 and likewise mounted on handlebars of a motorcycle. There is no need or requirement, nor does the specification limit, the positioning of a master cylinder 210 relative to hand brake 205. It is further noted that hydraulic pressure adjuster 225 need not, but may be, installed within hand brake 205. Hydraulic pressure adjuster 225 may be implemented in-line in brake hose 230, in slave cylinder 235, or on an external master cylinder 210 positioned on a handlebar. Hydraulic pressure adjuster 225 may be implemented at any location within the system to provide height adjustment for rod 255.

Figure 3:
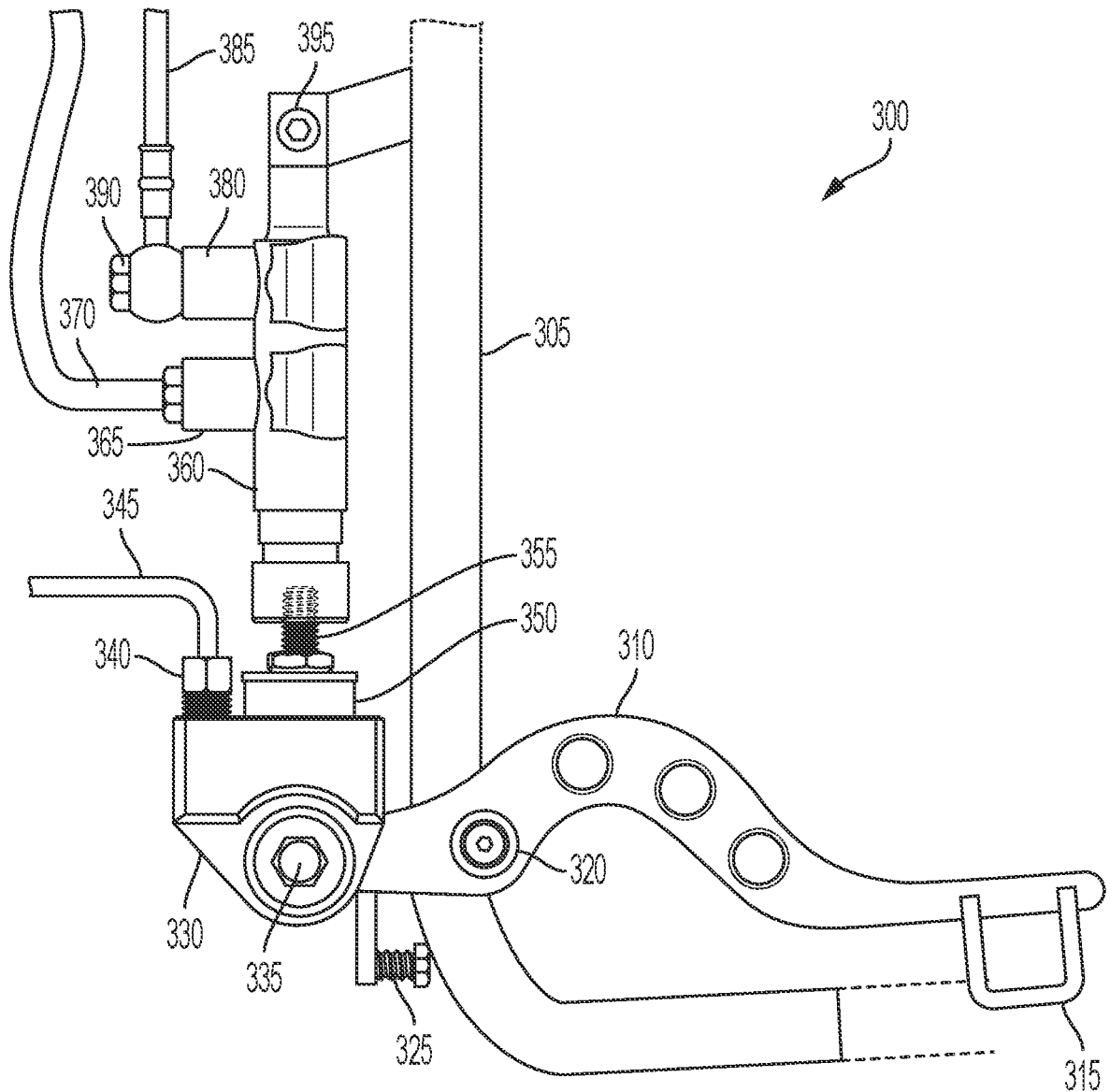
FIG. 3 illustrates an adjustable hydraulic motorcycle brake system in use on a motorcycle.

FIG. 3 illustrates an adjustable hydraulic motorcycle brake system 300 in use on a motorcycle. As shown in system 300, a motorcycle frame 305 is provided as part of and representative of a motorcycle, the details of which have been excluded for clarity in explanation. Frame 305 may provide structural support for a rear brake lever 310. Rear brake lever 310 may be connected directly or indirectly to frame 305 by a connector 320 which provides a pivot point for brake lever 310. Rear brake lever 310 may further include a foot peg 315 which may be positioned to be within easy reach of a motorcycle rider. Rear brake lever 310 may further include a brake stop 325 which fixes an angle of rear brake lever 310 to a user's preference to also facilitate easy access to rear brake lever 310 by a motorcycle rider's right foot. Brake stop 325 may further dictate a baseline height of a rod, such as rod 355, as the angle of the rear brake lever 310 is determined, at least in part by brake stop 325, which in turn affects a height of rod 355, as will be discussed below.

Slave cylinder 330, which may be similar in implementation and description to slave cylinder 235 shown above with respect to FIG. 2, may be connected to brake lever 310 by a connector 335 mounted through, for example, mounting port 245 of slave cylinder 235, shown in FIG. 2. Slave cylinder 330 may further be connected at hydraulic intake port 340 by a brake line 345 to hand brake 205, shown in FIG. 2. In FIG. 3, the intent is to show the slave cylinder 330 in position on a motorcycle brake lever 310 and explain how a height of rod 355 may be simply adjusted using the disclosed system. A height of rod 355 may be the degree or the length to which the rod extends above slave cylinder 330, for example, for the purpose of interacting with a master cylinder of a rear brake of a motorcycle.

Slave cylinder 330 may include a piston 350, which may be similar in implementation and description to piston 250 shown in FIG. 2. Piston 350 may be hydraulically actuated to force rod 355 up into master cylinder 360. However, a height of rod 355 determines a maximum degree of braking force that can be applied based on the force applied by rod 355 to master cylinder 360. For example, when slave cylinder 330 is installed, a baseline height of rod 355 may be set by an angle of rear brake lever 310 by adjustment of brake stop 325. A height of rod 355 must be sufficient to push on master cylinder 360 to actuate a master cylinder to apply a full braking force of which it is capable. In previous solutions, a rough adjustment could be made by moving a nut along threads on rod 355 to get a rough adjustment on the height of rod 355. However, unless the installation of slave cylinder 330 was perfect, the height of rod 355 could be inadequate to actuate a motorcycle master cylinder to apply a full braking force of which the motorcycle master cylinder is capable. The present disclosure remedies these deficiencies by providing a hydraulic adjustment to the height of rod 355. For example, hydraulic pressure adjuster 225, shown in FIG. 2, may be adjusted to increase a baseline hydraulic pressure within slave cylinder 330. This increase in baseline hydraulic pressure causes piston 350 to push and hold rod 355 higher than the baseline height of the rod based on the angle of rear brake lever 310 and brake stop 325. In this manner, a rider may interact with hydraulic pressure adjuster 225 to raise or lower a height of rod 355 hydraulically. Thus, even if slave cylinder 330 is installed poorly in a non-ideal position, a simple adjustment of the baseline hydraulic pressure by hydraulic pressure adjuster 225 may raise a height of rod 355 to a point where rod 355 is capable of exerting an appropriate amount of force on motorcycle master cylinder 360 to provide up to a full braking force of which the motorcycle master cylinder 360 is capable. Hydraulic pressure may be provided by a rider pulling brake lever 220 towards hand brake 205 to drive piston 350 to push rod 355 into contact with master cylinder 360. Master cylinder 360 may also be actuated, independently of hand brake 205, by a rider pushing down on foot peg 315, pivoting brake lever 310 around connector pivot point 320, and driving rod 355 up and into master cylinder 360. The hydraulic system of system 300 is independent from a hydraulic system of a motorcycle. Thus, in the event that either system 300 or the hydraulic system of the motorcycle fails, the other system may continue to provide braking power independently of the failed system.

In this manner, selective braking force may be applied across an entirety of a curve that describes braking force from zero to peak force while at the same time maintaining a baseline level of hydraulic pressure that is sufficient to hold rod 355 at a height sufficient to cause the motorcycle master cylinder to apply a full braking force of which motorcycle master cylinder 360 is capable. Adjustment of the height of the rod 355 by hydraulic pressure adjuster 225 allows for hydraulic adjustment of a height of rod 355 which is unknown to the prior art.

Figure 1:
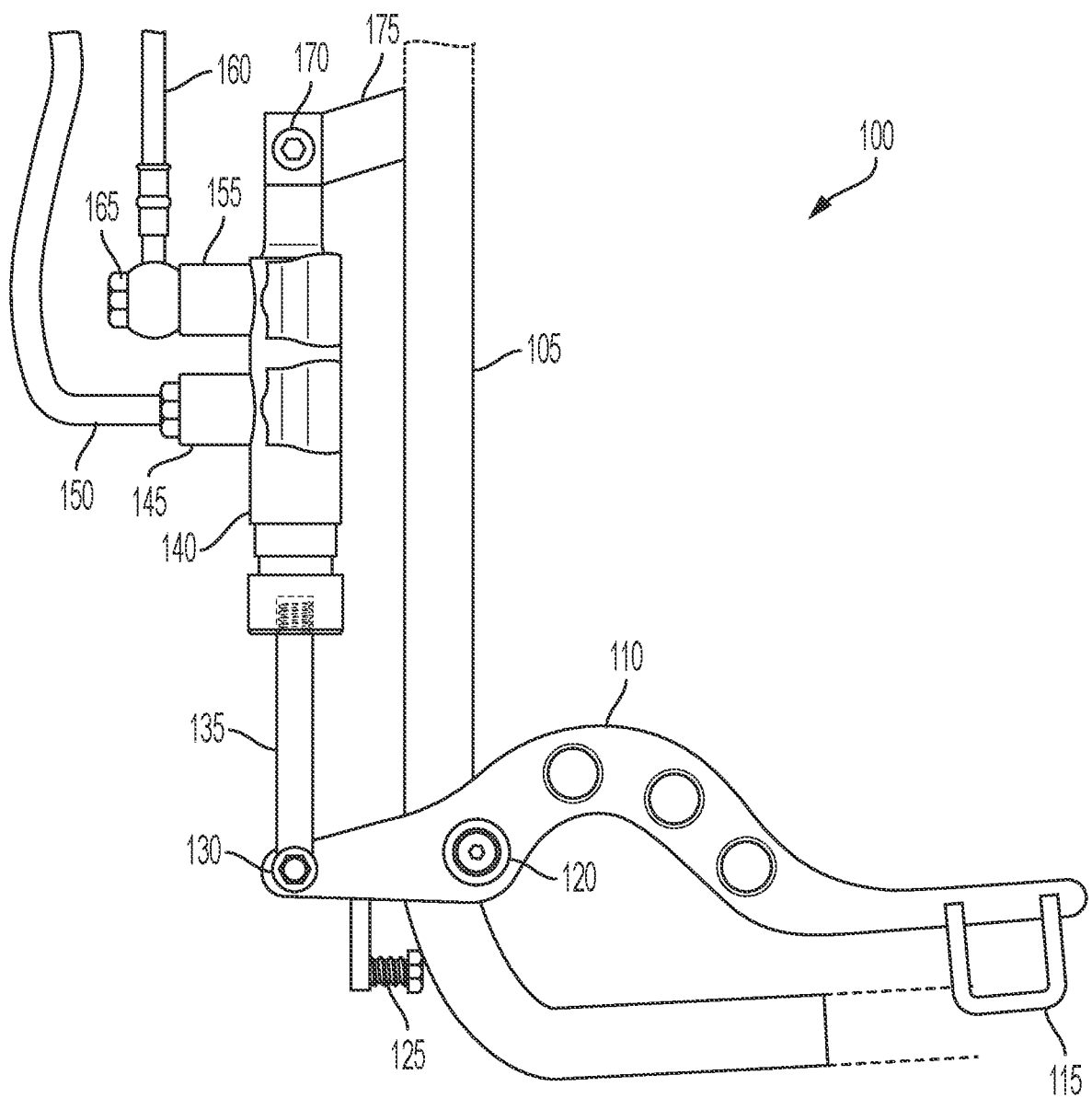
FIG. 1 illustrates a conventional right foot rear brake system.

It is noted that a further benefit of slave cylinder 330 is that while slave cylinder 360 includes hydraulic benefits, rod 355 may also be used in a manner similar to a conventional rod, such as rod 135 shown in FIG. 1, to facilitate braking by interaction with brake lever 310 and foot peg 315 by a rider's right foot. However, again, in such a case, a height of rod 355 is critical to proper operation of a motorcycle braking system and ensuring that motorcycle master cylinder 360 is able to apply a full braking pressure of which motorcycle master cylinder 360 is capable. Thus, hydraulic adjustment of a height of rod 355 by hydraulic pressure adjuster 225 is beneficial in operation of rear brake lever 310 by a rider's right foot as well as by interaction by the rider's hand with hand brake 205. FIG. 3 illustrates rod 355 being exposed to the ambient environment. In practice, rod 355 may be covered between master cylinder 360 and slave cylinder 330, by a boot made of any suitable material to withstand the temperatures, dirt, water, and flying road debris associated with on or off road travel. Rod 355 is shown as being exposed in FIG. 3 solely for the purposes of explanation.

Force applied to master cylinder 360 by rod 355 is converted by master cylinder 360 into hydraulic pressure. As the force increases when rod 355 is actuated by hand brake 205 or rear brake lever 360, hydraulic pressure within master cylinder 360 increases which is communicated through port 365 into rear brake line 370 to a braking device, such as a caliper to apply brakes to a rear wheel of a motorcycle. Master cylinder 360 may further be connected to a fluid reservoir by a brake hose 385 bolted by bolt 390 to a hydraulic intake port 380 within master cylinder 360. Master cylinder 360 may be provided with braking fluid through a fluid reservoir to ensure that no air or air bubbles are trapped within the hydraulic fluid chambers of master cylinder 360. Master cylinder 360 may be attached to frame 305 at a top end by connector 395.

Figure 4:
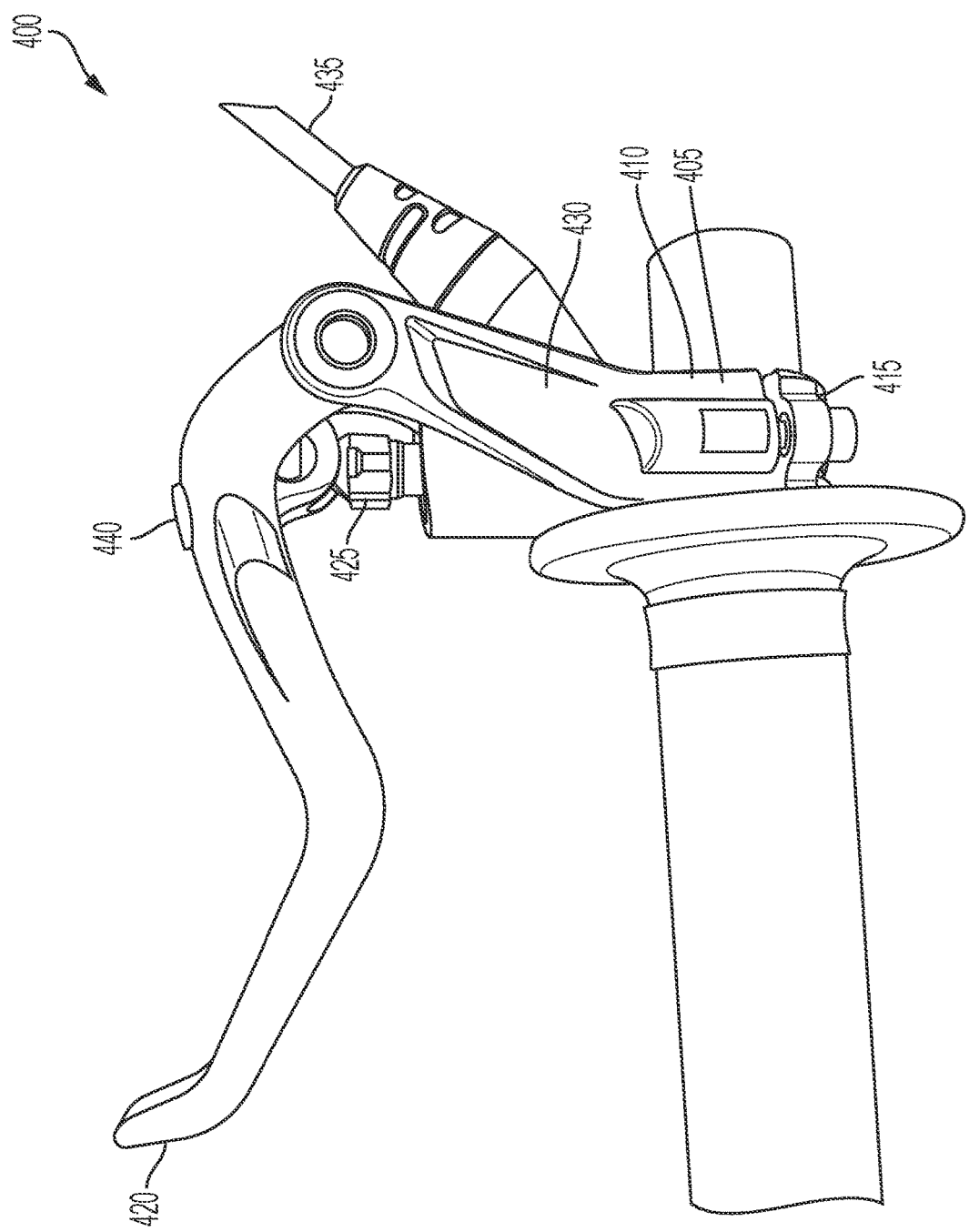
FIG. 4 illustrates a hand operated brake lever device for an adjustable hydraulic motorcycle brake system.

FIG. 4 illustrates a hand operated brake lever device 400 for an adjustable hydraulic motorcycle brake system, such as system 200 shown in FIG. 2. Brake lever device 400 may be similar to that shown in FIG. 2, although discussed with additional detail with respect to FIG. 4 given the closer perspective. As shown in FIG. 4, a hand brake 405 is shown mounted on a motorcycle handlebar. Hand brake 405 is shown as including an internal master cylinder 410 and is attached to the motorcycle handlebar by a handlebar mount 415. Hand brake 405 is further shown as including a brake lever 420 and a hydraulic pressure adjuster 425. Master cylinder 410 is connected within hand brake 405, as shown, to one or more hydraulic connections 430 to brake line 435. Brake lever 420 may also include a lever travel adjuster 440.

Master cylinder 410 within hand brake 405 may be implemented within hand brake 405 to apply hydraulic pressure to a hydraulic fluid within the system. Master cylinder 410 may further include an aperture, such as a threaded aperture for depositing hydraulic fluid within hand brake 405. Once hydraulic fluid is deposited within master cylinder 410, air and air bubbles may be bled from system 200, as described above. Master cylinder 410 may convert mechanical force, from a rider squeezing brake lever 420, for example, into hydraulic pressure to operate other components of system 200, shown in FIG. 2.

Figure 5:
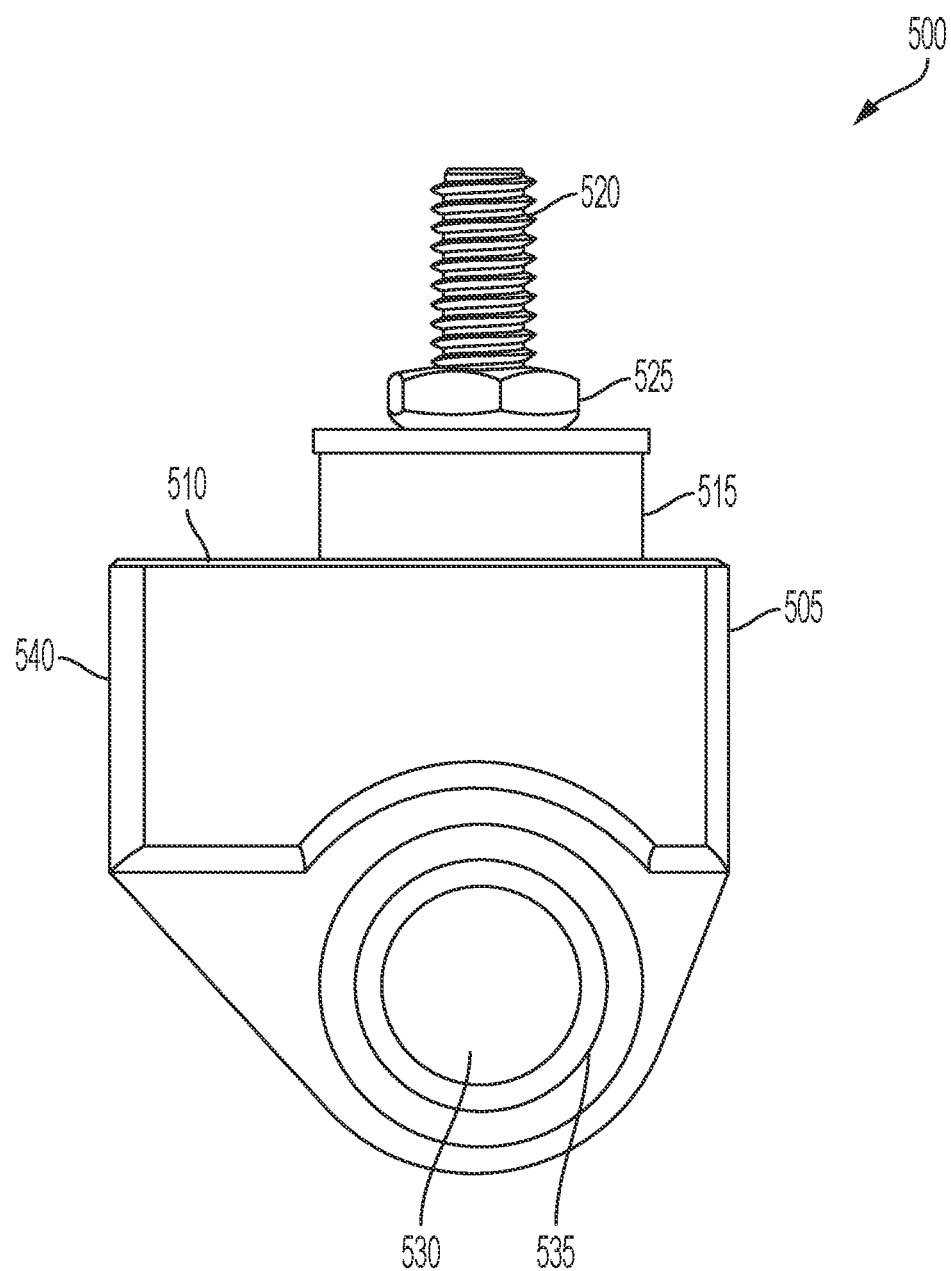
FIG. 5 illustrates a secondary or slave cylinder of an adjustable hydraulic motorcycle brake system.

Hand brake 405 may be secured to a handlebar of a motorcycle by a handlebar mount 415 which is disposed on hand brake 405. As shown in FIG. 5, handlebar mount 415 may be implemented by a rounded metal backing plate which may be screwed on a first and second end into hand brake 405 by corresponding screws. The rounded metal backing plate may include a radius that is approximately similar to the radius of the handlebar on the motorcycle and formed in generally a C shape such that the first and second ends are relatively proximate to hand brake 405 (e.g., within the length of a screw) for attaching handlebar mount 415 to a handlebar of a motorcycle. In other words, the backing plate may slide over the handlebars and position the first and second ends of the backing plate adjacent to hand brake 405 such that screws may apply pressure to the backing plate and handlebar to maintain hand brake 405 in a desired position on the handlebar of the motorcycle.

Hand brake 405 further includes a brake lever 420 which is attached to hand brake 405 by a pivoting connection such that brake lever 420 may be pulled and drawn toward hand brake 405. Brake lever 420 has a particular "throw" or "length of travel" which dictates how much pressure may be applied to master cylinder 410 and therefore to system 200, shown in FIG. 2. The harder brake lever 420 is squeezed, the more hydraulic pressure is generated. At the same time, however, the length of travel for brake lever 420 from full extension to full contraction may be adjusted by a lever travel adjuster 440. Lever travel adjuster 440 determines where during the throw of lever 420, or the length of travel of lever 420, a hydraulic pressure curve starts and peaks and is subject to adjustment based on the rider's preferences. Lever travel adjuster 440 essentially determines where along the path of travel the master cylinder is engaged to create hydraulic pressure. Lever travel adjuster 440 may be implemented as a simple screw or set screw or may include a rotatable dial or another interactive element known in the art sufficient to increase or reduce a length of travel for brake lever 420. Some riders prefer that braking power is virtually instant with very little brake lever travel while other riders want to "ride the brakes" and constantly hold the brakes at a half travel position before actual braking occurs. For example, if the length of travel of brake lever 420 relative to hand brake 405 is 90 degrees, lever travel adjuster 440 may be set to engage hydraulic pressure at 85 degrees for one rider while another rider prefers engagement of hydraulic pressure to occur when brake lever 420 is positioned at 45 degrees relative to hand brake 405. For clarity, lever travel adjuster 440 determines only where along the length of travel of brake lever 420, brake lever 420 begins to engage master cylinder 410 to produce hydraulic pressure.

Thus, brake lever 405 includes hydraulic pressure adjuster 425 which controls a hydraulic fluid pressure generated by master cylinder 410 within hand brake 405. Specifically, hydraulic pressure adjuster 425 sets a baseline hydraulic fluid pressure within system 200, shown in FIG. 2, to ensure that the hydraulic pressure available to a slave cylinder, such as slave cylinder 235, shown in FIG. 2, is sufficient to initiate braking force in a motorcycle master cylinder. For example, referring to a hydraulic pressure braking curve mentioned above from zero to peak pressure, lever travel adjuster 440 may determine where between 90 degrees and zero degrees braking force begins. Hydraulic pressure adjuster 425 determines a baseline pressure that may be constant within system 200. For example, hydraulic pressure adjuster 425 may be adjusted to maintain a baseline of 10% of overall braking force at all times in order to set a height of a master cylinder rod 255, shown in FIG. 2. In such a case, lever travel adjuster 440 may still adjust where along the length of pull of brake lever 420 braking begins and may cause a selective amount of pressure to be applied (e.g., for a quick stop or a slow stop of the motorcycle) over a baseline hydraulic pressure set by hydraulic pressure adjuster 425.

Hand brake 405, may further include one or more internal hydraulic communication ports 430, which may be implemented to connect master cylinder 410 to brake hose 435 to increase and reduce hydraulic pressure within system 200. One of hydraulic communication ports 430 may extend to an outside surface of hand brake 405 and serve as a fluid fill port for filling system 200 with appropriate braking fluid. Hydraulic communication ports 430 may connect master cylinder 410 to a brake line 435 which connects to a slave cylinder 235, as shown in FIG. 2. Brake line 435 may be hydraulically rated to withstand pressures generated by system 200, shown in FIG. 2, and include appropriate connections for connecting hand brake 405 to slave cylinder 235, shown in FIG. 2. Brake line 435 may also be made from a material that is kink or dent resistant to ensure that appropriate and intended pressure is conveyed from master cylinder 410 in hand brake 405 to slave cylinder 235, shown in FIG. 2.

It is also noted that modifications may be made that are still within the scope of the present disclosure. For example, components that are found within hand brake 405 in FIG. 4 need not be solely contained within hand brake 405. For example, master cylinder 410 may be external to hand brake 405 and likewise mounted on handlebars of a motorcycle. There is no need or requirement, nor does the specification limit, the positioning of a master cylinder 410 relative to hand brake 405. It is further noted that hydraulic pressure adjuster 425 need not, but may be, installed within hand brake 405. Hydraulic pressure adjuster 425 may be implemented in-line in brake hose 435, in slave cylinder 235 shown in FIG. 2, or on an external master cylinder 410 positioned on a handlebar. Hydraulic pressure adjuster 425 may be implemented at any location within the system to provide height adjustment for rod 255 shown in FIG. 2.

FIG. 5 illustrates a device 500 including a slave cylinder 505 of an adjustable hydraulic motorcycle brake system 200, which is shown in FIG. 2. Slave cylinder 505 may be similar in implementation and description to slave cylinder 235 shown in FIG. 2 although shown in FIG. 5 with additional detail due to a closer and more detailed perspective shown in FIG. 5.

Slave cylinder 505 includes a port 510 for receiving hydraulic fluid and pressure communicated by master cylinder 210 shown in FIG. 2. As will be discussed below, port 510 may be hydraulically connected to a series of chambers and passages within slave cylinder 505 to cause an internal piston 525 to exert pressure on a rod 520 which may interact with a motorcycle master cylinder on a motorcycle to produce braking power. For example, as hydraulic pressure is communicated from hand brake 205 and master cylinder 210, both shown in FIG. 2, to slave cylinder 505, the hydraulic pressure is applied to piston 515 which causes piston 515 to push rod 520 higher out of slave cylinder 505.

As shown in FIG. 5, slave cylinder 505 may further include a mounting port 530. Mounting port 530 may include a movable bearing 535 installed in mounting port 530. Mounting port 530 allows slave cylinder 505 to be mounted to a motorcycle. In a preferable embodiment, slave cylinder 505 may be mounted directly to a foot brake lever on a motorcycle, as discussed above.

Rod 520 may be connected to or may be positioned adjacent to piston 515 in slave cylinder 505 to allow piston 515 to selectively increase or reduce a height level of rod 520, as discussed above. Rod 520 may be threaded with a nut 525 to provide an initial rough adjustment height level for rod 520 that may be further refined by adjustment of a hydraulic pressure within slave cylinder 505 by, for example, hydraulic pressure adjuster 225, shown in FIG. 2. Nut 525 may ensure that rod 520 may not drop below a particular height level.

Slave cylinder 505 may further include a bleed port 540 which may be sealed by, for example, a bleed screw. Bleed port 540 will be discussed below with respect to FIG. 6. However, bleed port 540 allows for a user to apply brake fluid into hydraulic connections, such as hydraulic connections 430 shown in FIG. 4, and for that brake fluid to travel, generally by gravity, into slave cylinder 505. As the brake fluid travels from hand brake 205 shown in FIG. 2 through brake hose 230 and into slave cylinder 505, air within the system is displaced and pushed out through either bleed port 540 or hydraulic connections 430, shown in FIG. 4. When fluid appears to have displaced all of the air within slave cylinder 505, bleed port 540 may be sealed and system 200, shown in FIG. 2 may be adequately bled to ensure braking functionality within system 200.

Figure 6:
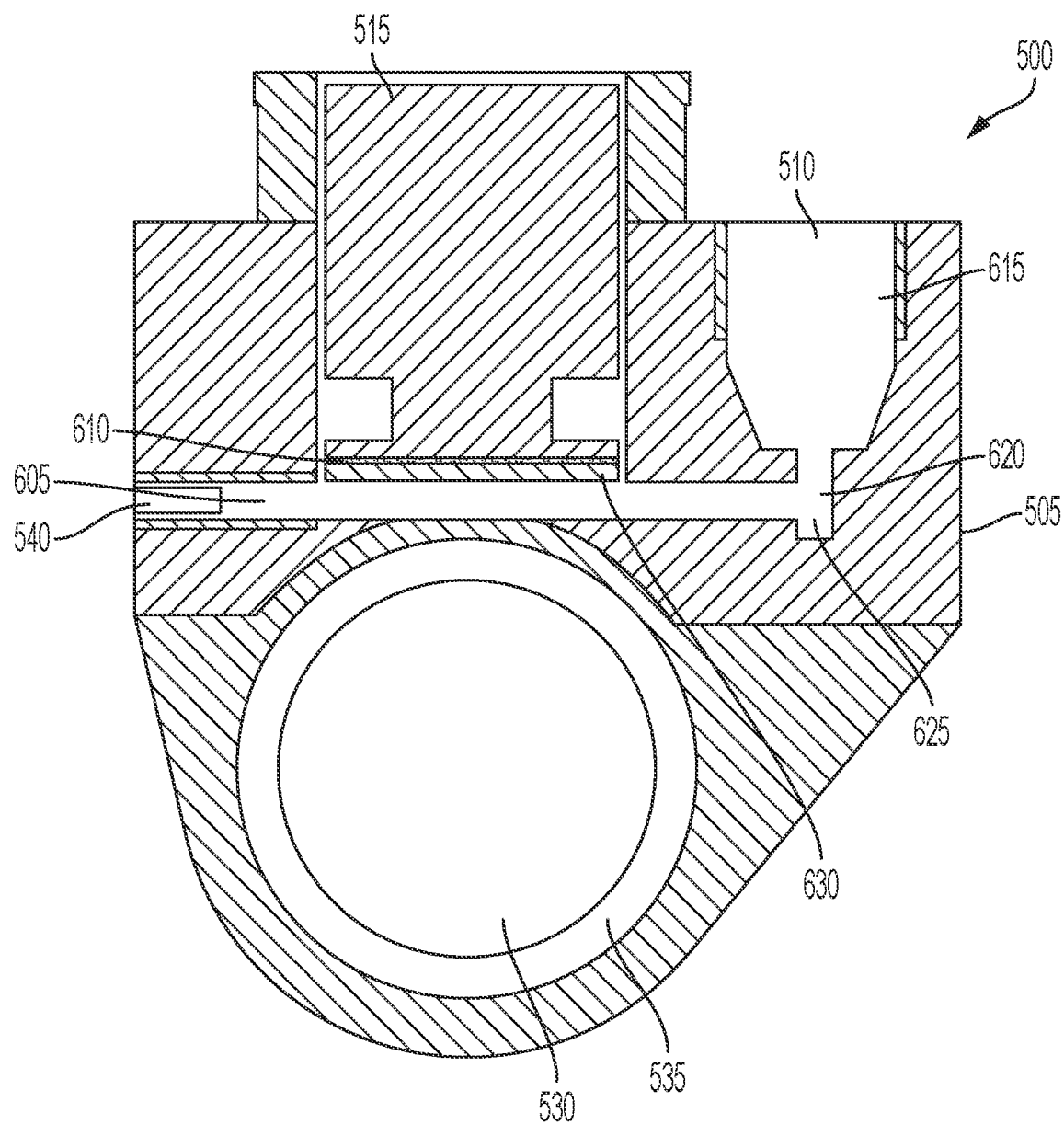
FIG. 6 illustrates a cross sectional view of the secondary or slave cylinder of an adjustable hydraulic motorcycle brake system shown in FIG. 5.

FIG. 6 illustrates a cross sectional view of a device 500 that includes slave cylinder 505 of an adjustable hydraulic motorcycle brake system 200 shown in FIG. 2. Slave cylinder 505 may be similar to slave cylinder 505 shown in FIG. 5, slave cylinder 235 shown in FIG. 2, and slave cylinder 335 shown in FIG. 3. As shown in FIG. 5, slave cylinder 505 may further include a mounting port 530. Mounting port 530 may include a movable bearing 535 installed in mounting port 530. Mounting port 530 allows slave cylinder 505 to be mounted to a motorcycle.

Internally, slave cylinder 505 may include a bleed channel 605 which interfaces with bleed port 540 including a bleed seal, shown in FIG. 6 as a screw. Slave cylinder may further include a piston chamber 630 which is sealed by piston seal 610 such that hydraulic fluid is maintained within system 500 without passing over piston seal 610. Piston seal 610 allows hydraulic fluid to move piston 610 and rod 520, shown in FIG. 5, by moving piston 610 up and down within piston chamber 630. Piston 610 may have a diameter that exceeds 12.7 millimeters as a piston 610 with a diameter that is 12.7 millimeters or lower increases the difficulty of a rider to pull on brake lever 220, shown in FIG. 2. An increased diameter of piston 610, exceeding 12.7 millimeters, requires less effort to produce the same hydraulic force than conventional 12.7 millimeter diameter pistons. In combination with, for example, lever travel adjuster 260, piston 610 exceeding 12.7 millimeters provides an increase in available hydraulic force (depending on how hydraulic pressure adjuster 225 is adjusted) over previous solutions with a decrease in the amount of lever travel necessary to apply braking power.

Slave cylinder 505 may further include a contamination sump 625. When contaminants enter into slave cylinder 505 through contaminated brake fluid, grime, grease, dirt, or any other contaminant, travel by the contaminant in the system is undesirable as the contaminant may cause undue wear on internal components of slave cylinder 505, including on piston seal 610. In order to reduce the level of contamination within slave cylinder 505, contamination sump 625 is provided as a lowest point in the system where contaminants may settle and be trapped as fluid moves in the system. In this manner, components such as piston seal 610 may be protected from premature wear.

Hydraulic fluid may enter slave cylinder 505 through port 510. Port 510 may be connected to piston chamber 630 by a channel 620 which is connected to contamination sump 625 and bleed channel 605. Thus, hydraulic fluid may be contained within slave cylinder 505 by port 510 piston seal 610, and bleed port 540. Containing the hydraulic fluid, or brake fluid, within slave cylinder 505 and system 200 ensures that hydraulic pressure can be increased to drive piston 515 to push rod 520 into engagement with a master cylinder through a hand brake, such as hand brake 205 shown in FIG. 2.

The foregoing system and devices provide advantages unknown to the prior art by reducing the difficulty of installation by virtue of a hydraulically adjustable rod in a slave cylinder that may interface with a motorcycle master cylinder. Further the foregoing system and devices provide additional flexibility in allowing for reduced brake lever travel while generating the same hydraulic force with piston that exceeds 12.7 millimeters in diameter.

EXAMPLES

Example 1 may include a system comprising a slave cylinder for a motorcycle, the slave cylinder including a rod with a height which is hydraulically adjustable by a hydraulic pressure adjuster.

Example 2 may include the example of example 1, wherein the height of the rod is a baseline height.

Example 3 may include the examples of any of examples 1 and 2 wherein the height of the rod is increased by a piston disposed within the slave cylinder.

Example 4 may include the examples of any of examples 1-3 wherein a diameter of the piston exceeds 12.7 millimeters.

Example 5 may include the examples of any of examples 1-4 wherein the slave cylinder mounts to a rear brake lever of a motorcycle.

Example 6 may include the example of any of examples 1-5 further comprising a hand brake with a brake lever.

Example 7 may include the example of any of examples 1-6 wherein the hand brake is connected to the slave cylinder by a brake hose.

Example 8 may include the examples of any of examples 1-7 further comprising a master cylinder connected to the brake hose.

Example 9 may include the example of any of examples 1-8 wherein the brake hose is connected to the slave cylinder.

Example 10 may include the example of any of examples 1-9 wherein the hand brake includes a brake lever travel adjuster.

Example 11 may include the example of any of examples 1-10 wherein the rod on the slave cylinder extends to interact with a master cylinder of a motorcycle.

Example 12 may include a motorcycle slave cylinder comprising a rod having a height and a hydraulic pressure adjuster, wherein the hydraulic pressure adjuster hydraulically adjust the height of the rod above the motorcycle slave cylinder.

Example 13 may include the example of example 12 further comprising a piston disposed within the motorcycle slave cylinder.

Example 14 may include the example of any of examples 12-13 wherein the piston is disposed within a piston cylinder of the motorcycle slave cylinder.

Example 15 may include the example of any of examples 12-14 wherein the piston has a diameter exceeding 12.7 millimeters.

Example 16 may include the example of any of examples 12-15 wherein the piston further includes a piston seal.

Example 17 may include the example of any of examples 12-16 wherein the motorcycle slave cylinder further includes a bleed port.

Example 18 may include the example of any of examples 12-17 further comprising a mounting port.

Example 19 may include the example of any of examples 12-18 wherein the mounting port is positioned to connect the motorcycle slave cylinder to a motorcycle brake lever.

Example 20 may include the example of any of examples 12-20 wherein the rod is positioned in the motorcycle slave cylinder to interact with a motorcycle master cylinder when mounted on a rear brake lever of a motorcycle.

The foregoing description is presented for purposes of illustration. It is not exhaustive and does not limit the invention to the precise forms or embodiments disclosed. Modifications and adaptations are apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A system, comprising:
    a slave cylinder which actuates only a rear brake of a motorcycle, the slave cylinder including a rod with a height extending above the slave cylinder, the height of the rod being hydraulically adjustable by a hydraulic pressure adjuster connected to a master cylinder in fluidic communication with the slave cylinder.

2. The system of claim 1, further comprising a hand brake with a brake lever.

3. The system of claim 2, wherein the hand brake is connected to the slave cylinder by a brake hose.

4. The system of claim 3, wherein the brake hose is connected to the slave cylinder.

5. The system of claim 2, wherein the hand brake includes a brake lever travel adjuster.

6. The system of claim 1, wherein the height of the rod is a baseline height.

7. The system of claim 1, wherein the height of the rod is increased by a piston disposed within the slave cylinder.

8. The system of claim 1, wherein a diameter of the piston exceeds 12.7 millimeters.

9. The system of claim 1, wherein the slave cylinder mounts to a rear brake lever of a motorcycle.

10. The system of claim 1, wherein the rod on the slave cylinder extends in height to interact with a master cylinder of a motorcycle.

11. The system of claim 1, wherein fluidic communication between the slave cylinder and the master cylinder is independent of a braking system of the motorcycle.

12. A motorcycle slave cylinder, comprising:
    a rod having a height extending above the motorcycle slave cylinder and
    a hydraulic pressure adjuster connected to a master cylinder, wherein the hydraulic pressure adjuster hydraulically adjusts the height of the rod extending above the motorcycle slave cylinder, the master cylinder and the slave cylinder being in fluidic communication.

13. The motorcycle slave cylinder of claim 12, further comprising a piston disposed within the motorcycle slave cylinder.

14. The motorcycle slave cylinder of claim 13, wherein the piston is disposed within a piston cylinder of the motorcycle slave cylinder.

15. The motorcycle slave cylinder of claim 14, wherein the piston has a diameter exceeding 12.7 millimeters.

16. The motorcycle slave cylinder of claim 15, wherein the piston further includes a piston seal.

17. The motorcycle slave cylinder of claim 12, wherein the motorcycle slave cylinder further includes a bleed port.

18. The motorcycle slave cylinder of claim 12, further comprising a mounting port.

19. The motorcycle slave cylinder of claim 18, wherein the mounting port is positioned to connect the motorcycle slave cylinder to a motorcycle brake lever.

20. The motorcycle slave cylinder of claim 12, wherein the rod is positioned in the motorcycle slave cylinder to interact with a motorcycle master cylinder when mounted on a rear brake lever of a motorcycle.

* * * * *